US012811426B2

(12) United States Patent
Wang et al.

(10) Patent No.: US 12,811,426 B2
(45) Date of Patent: Nov. 24, 2026

(54) CONTROL METHOD FOR POWER SUPPLY DEVICE, AND POWER SUPPLY DEVICE

(71) Applicant: ECOFLOW INC., Shenzhen (CN)

(72) Inventors: Lei Wang, Shenzhen (CN); Xi Chen, Shenzhen (CN)

(73) Assignee: ECOFLOW INC., Shenzhen (CN)

( * ) Notice: Subject to any disclaimer, the term of this patent is extended or adjusted under 35 U.S.C. 154(b) by 371 days.

(21) Appl. No.: 18/399,333

(22) Filed: Dec. 28, 2023

(65) Prior Publication Data

US 2024/0128781 A1 Apr. 18, 2024

Related U.S. Application Data

(63) Continuation of application No. PCT/CN2022/093237, filed on May 17, 2022.

(30) Foreign Application Priority Data

Jun. 30, 2021 (CN) ......................... 202110745087.5

(51) Int. Cl.
*H02J 7/80* (2026.01)
*H02J 7/00* (2006.01)
(Continued)

(52) U.S. Cl.
CPC ................ *H02J 7/933* (2026.01); *H02J 7/35* (2013.01); *H02J 7/80* (2026.01); *H02J 7/855* (2026.01); *H02J 7/94* (2026.01)

(58) Field of Classification Search
CPC ...... H02J 7/933; H02J 7/35; H02J 7/80; H02J 7/855; H02J 7/94
See application file for complete search history.

(56) References Cited

U.S. PATENT DOCUMENTS 5,764,040 A * 6/1998 Miller ..................... G05F 1/618 323/282
2011/0191612 A1 8/2011 Itakura et al.
(Continued)

FOREIGN PATENT DOCUMENTS

CN 102687094 A 9/2012
CN 106376142 A * 2/2017 ............ H05B 45/40
(Continued)

OTHER PUBLICATIONS

The European Patent Office (EPO) The Extended European Search Report for Application No. 22831484.5 Nov. 11, 2024 8 Pages.
(Continued)

*Primary Examiner* — Michael W Choi
(74) *Attorney, Agent, or Firm* — ANOVA LAW GROUP, PLLC

(57) ABSTRACT

Control method of a power supply device includes: acquiring, in response to an access operation to an output interface, a demand electric energy parameter of a load device connected to the output interface; when a current output electric energy parameter of the output interface meets the demand electric energy parameter, using the current output electric energy parameter as a target output electric energy parameter, otherwise determining an output electric energy parameter greater than the demand electric energy parameter as the target output electric energy parameter; controlling a power supply circuit to output the target output electric energy parameter to the load device through the output interface, to enable the load device to start to run with the target output electric energy parameter; and adjusting the target output electric energy parameter outputted by a power supply circuit to the output interface to be consistent with the demand electric energy parameter.

12 Claims, 3 Drawing Sheets

(51) Int. Cl.

| | |
|---|---|
| ***H02J 7/35*** | (2006.01) |
| ***H02J 7/90*** | (2026.01) |
| ***H02J 7/94*** | (2026.01) |

(56) References Cited

U.S. PATENT DOCUMENTS

| | | | | |
|---|---|---|---|---|
| 2015/0372538 | A1 | 12/2015 | Siegler et al. | |
| 2016/0013654 | A1* | 1/2016 | Saha | H02J 1/14 307/29 |
| 2019/0109458 | A1 | 4/2019 | Yamauchi et al. | |

FOREIGN PATENT DOCUMENTS

| | | | |
|---|---|---|---|
| CN | 113328502 | A | 8/2021 |
| JP | H06245487 | A | 9/1994 |

OTHER PUBLICATIONS

The World Intellectual Property Organization (WIPO) International Search Report for PCT/CN2022/093237 Aug. 1, 2022 5 Pages (with translation).

* cited by examiner

CONTROL METHOD FOR POWER SUPPLY DEVICE, AND POWER SUPPLY DEVICE

CROSS-REFERENCE TO RELATED APPLICATIONS

This application is a continuation application of PCT patent application No. PCT/CN2022/093237, filed on May 17, 2022, which claims priority to Chinese Patent Application No. 2021107450875, filed on Jun. 30, 2021, which is incorporated herein by reference in its entirety.

TECHNICAL FIELD

This application relates to the field of power supply technologies, and in particular, to a control method of a power supply device and a power supply device.

BACKGROUND

Statements herein provide only background information related to this application and do not necessarily constitute exemplary technologies.

A conventional power supply device such as an energy storage device provides an interface for power output. A user needs to manually select an electric energy parameter such as a power magnitude for interface output during use, or needs to insert a power consuming load into an interface with a corresponding electric energy parameter. For example, the energy storage device can output several to-be-selected powers, and the user may select a required power to perform a determining operation, so that the energy storage device may output the power selected by the user. Therefore, the conventional power supply device has complex operations and poor user experience.

SUMMARY

According to embodiments of this application, a control method of a power supply device and a power supply device are provided.

A first aspect of embodiments of this application provides a control method of a power supply device, where the power supply device includes a power supply circuit and an output interface, the power supply circuit is connected to the output interface, the power supply circuit outputs an electric energy parameter through the output interface, and the control method includes:

- acquiring, in response to an access operation to the output interface, a demand electric energy parameter of a load device connected to the output interface;
- acquiring a current output electric energy parameter of the output interface;
- when the current output electric energy parameter of the output interface meets the demand electric energy parameter, using the current output electric energy parameter as a target output electric energy parameter, and when the current output electric energy parameter of the output interface does not meet the demand electric energy parameter, determining an output electric energy parameter greater than the demand electric energy parameter as the target output electric energy parameter;
- controlling the power supply circuit to output the target output electric energy parameter to the load device through the output interface, to enable the load device to start to run with the target output electric energy parameter; and
- after it is determined that the load device is running, adjusting the target output electric energy parameter outputted by the power supply circuit to the output interface to be consistent with the demand electric energy parameter.

A second aspect of embodiments of this application provides a power supply device, including:

- an output interface;
- a power supply circuit, configured to output an electric energy parameter through the output interface; and
- one or more processors, where the one or more processors operate separately or together, and are configured to implement steps of the foregoing control method of a power supply device.

Details of one or more embodiments of this application are provided in the accompanying drawings and description below. Other features, objectives, and advantages of this application will become apparent from the specification, the accompanying drawings, and the claims.

BRIEF DESCRIPTION OF THE DRAWINGS

To describe the technical solutions in the embodiments or exemplary technologies of this application more clearly, the accompanying drawings required in the description of the embodiments or exemplary technologies are briefly described below. Apparently, the accompanying drawings in the following description show merely some embodiments of this application, and persons of ordinary skill in the art may still derive drawings of other embodiments from these accompanying drawings without creative efforts.

DETAILED DESCRIPTION

To make the objectives, technical solutions, and advantages of this application clearer, this application is further described below in detail with reference to the accompanying drawings and embodiments. It should be understood that the specific embodiments described herein are only used for describing this application rather than limiting this application.

It should be noted that, if not conflicting, various features in embodiments of this application may be combined with each other, all falling within the scope of protection of this application. In addition, although the division of functional modules is made in the schematic diagrams of apparatuses and the logical order is shown in the flowcharts, in some cases, the steps shown or described may be performed using division of modules different from that in the schematic diagrams of apparatuses or in an order different from that in the flowcharts.

Figure 1:
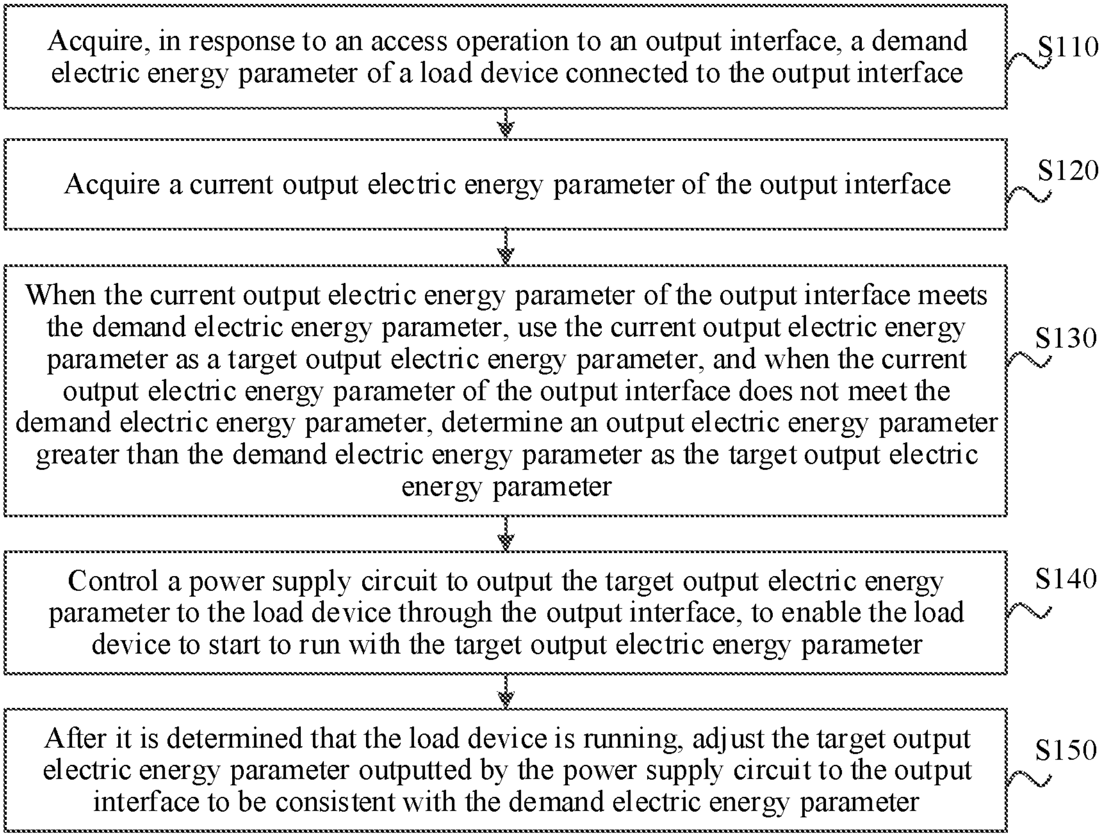
FIG. 1 is a schematic flowchart of a control method of a power supply device according to an embodiment of this application.

Refer to FIG. 1. An embodiment of this application provides a control method of a power supply device. The control method may be used in a power supply device 100 such as an energy storage device for a process of adjusting an electric energy parameter such as a power, a voltage, or a current of interface output of the power supply device 100. Certainly, this application is not limited thereto. For example, the control method may be used in the terminal device. The terminal device can be communicatively connected to the power supply device 100. For example, the terminal device includes a mobile phone, a tablet computer, a desktop computer, a remote control, and the like. In some implementations, the control method may be used in a load device 200 connected to the power supply device 100. For ease of description, embodiments of this application are mainly described by using an example in which the control method is used in the power supply device 100.

Figure 2:
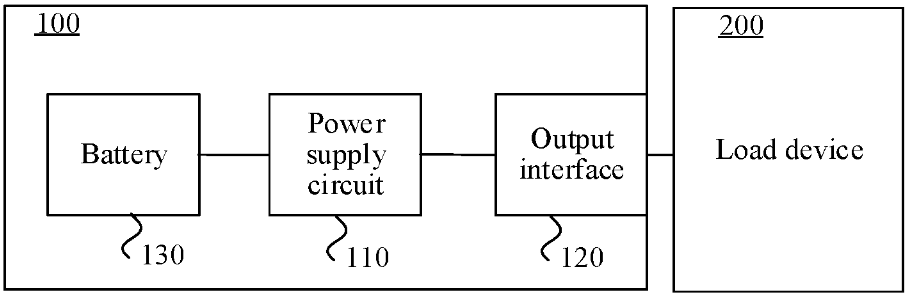
FIG. 2 is a schematic block diagram of a power supply device connected to a load device according to an implementation.

In some implementations, as shown in FIG. 2, the power supply device 100 includes a power supply circuit 110 and an output interface 120. The power supply circuit 110 is connected to the output interface 120. The power supply circuit 110 outputs an electric energy parameter through the output interface 120.

The output interface 120 can be connected to the load device 200. For example, the load device 200 may be an alternating current load or a direct current load. For example, the load device 200 may include at least one of the following: a motor, a heating apparatus, a cooling apparatus, and a light-emitting apparatus. Certainly, this application is not limited thereto. For example, the load device may be a terminal device such as a mobile phone or a computer.

The power supply circuit 110 is configured to perform one or more types of the following processing on electric energy to adjust electric energy parameters of output: rectification, inversion, voltage adjustment, current adjustment, and frequency adjustment. Certainly, this application is not limited thereto. For example, the power supply circuit may adjust a power outputted by the power supply circuit 110. For example, the power outputted by the power supply circuit 110 may be adjusted by adjusting a voltage amplitude and/or a current amplitude outputted by the power supply circuit 110.

In some implementations, the power supply circuit 110 includes an inverter circuit and/or a transformer. For example, an inverter can output alternating current electricity with a plurality of voltage amplitudes. For example, the inverter may include a multi-level inverter. For example, the transformer can output alternating current electricity with a plurality of voltage amplitudes. For example, the transformer includes a multi-tap transformer or a variable autotransformer. Certainly, this application is not limited thereto. For example, the power supply circuit 110 may include, for example, a rectifier circuit, a frequency conversion circuit, and a direct current-to-direct current (DC-DC) conversion circuit.

In some implementations, the power supply circuit 110 includes a plurality of first switch elements 112. For example, an inverter or a transformer 111 in the power supply circuit 110 includes a plurality of first switch elements 112. The power supply circuit 110 may be enabled, by opening or closing each first switch element 112, to output different electric energy parameters such as powers.

Figure 3:
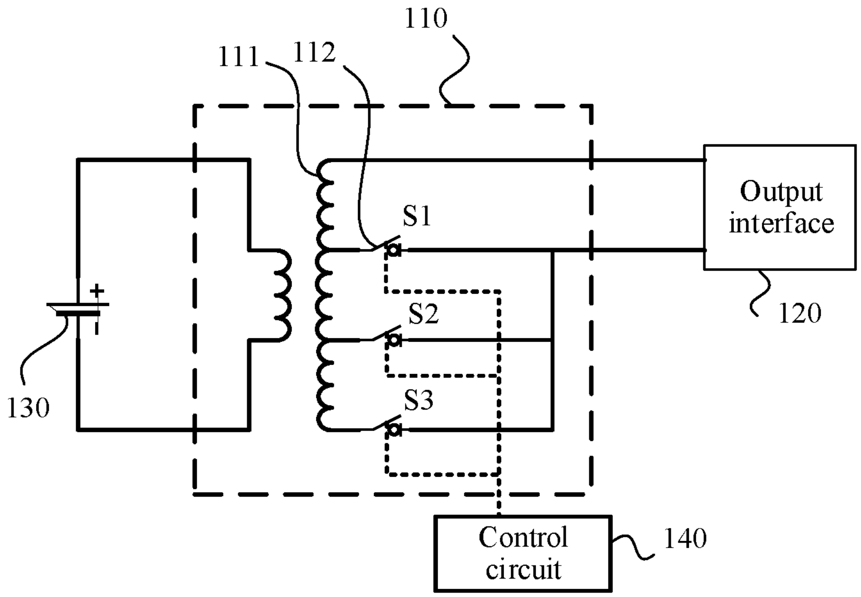
FIG. 3 is a schematic diagram of a structure of a power supply device according to an implementation.

For example, as shown in FIG. 3, the power supply circuit 110 includes the transformer 111. A primary stage or a secondary stage of the transformer 111 includes a plurality of taps. For example, the secondary stage of the transformer 111 includes four taps. Three taps are separately connected to the output interface 120 by one first switch element 112. The three first switch elements 112 may be respectively referred to as S1, S2, and S3. The voltage amplitude outputted by the power supply circuit 110 when S3 is closed is greater than the voltage amplitude outputted by the power supply circuit 110 when S2 is closed. The voltage amplitude outputted by the power supply circuit 110 when S2 is closed is greater than the voltage amplitude outputted by the power supply circuit 110 when S1 is closed. The power supply circuit 110 may be enabled, by controlling closing of different first switch elements 112, to output different electric energy parameters.

It should be noted that the power supply device 100 may include an energy storage apparatus, for example, a rechargeable battery or a non-rechargeable battery, or may not include an energy storage apparatus. For example, the power supply device 100 may acquire electric energy from outside, for example, acquire electric energy from a grid, a generator, the energy storage apparatus connected to the power supply device 100, a solar battery, or the like. For example, as shown in FIG. 2, the power supply device 100 include a battery 130.

Figure 4:
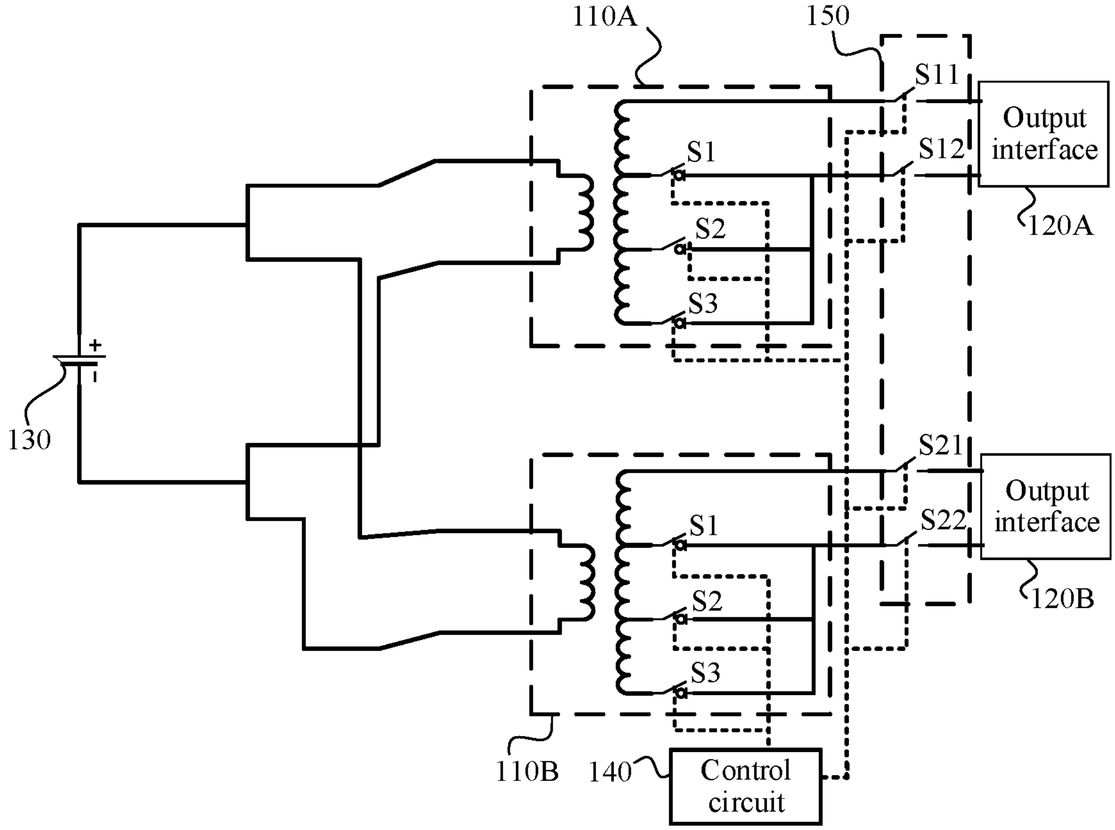
FIG. 4 is a schematic diagram of a structure of a power supply device according to another implementation.

In some implementations, as shown in FIG. 3 and FIG. 4, the power supply device 100 further includes a control circuit 140. For example, the control circuit 140 can be configured to perform the control method of a power supply device in embodiments of this application. For example, the control circuit 140 can control opening or closing of the first switch element 112 in the power supply circuit 110 to enable the power supply circuit 110 to output different electric energy parameters.

Refer to FIG. 1. The control method of a power supply device includes the following step S110 to step S150.

Step S110: Acquire, in response to an access operation to an output interface, a demand electric energy parameter of a load device connected to the output interface.

In some implementations, it may be detected whether the output interface 120 is connected to the load device 200, and when it is detected that the output interface 120 is connected to the load device 200, a demand electric energy parameter of the load device 200 is acquired.

For example, the demand electric energy parameter of the load device 200 may be acquired through a communicative connection with the load device 200. The communicative connection may include a communicative connection through the output interface 120.

For example, the demand electric energy parameter of the load device 200 is constant or is variable. For example, the load device 200 has different demand powers during initial start and stable running. For example, the motor or the heating device in the load device 200 has a higher demand power within a period of time during initial start and running, and has a lower demand power during stable running.

Step S120: Acquire a current output electric energy parameter of the output interface.

For example, the power supply circuit 110 corresponds to a preset electric energy parameter output range. In some implementations, an output electric energy parameter of the power supply circuit 110 is continuously adjustable. In some other implementations, the electric energy parameter output range corresponding to the power supply circuit 110 includes a plurality of different output electric energy parameters. In other words, the output electric energy parameter of the power supply circuit 110 may be not continuous. Refer to FIG. 3, the power supply circuit 110 may be enabled, by controlling closing of three different first switch elements 112 in the power supply circuit 110, to output three different electric energy parameters.

In some implementations, the acquiring a current output electric energy parameter of the output interface includes: acquiring a rated output electric energy parameter of the output interface, and using the rated output electric energy parameter as the current output electric energy parameter of the output interface. It may be understood that, when the output interface 120 of the power supply device 100 is not connected to the load device 200, a rated output electric energy parameter of the output interface 120 may be used as a target output electric energy parameter. For example, a rated output power of the output interface 120 is 300 watts (W) or 1000 W.

In some implementations, the acquiring a current output electric energy parameter of the output interface includes: acquiring an electric energy parameter outputted by the output interface a previous time, and using the electric energy parameter outputted by the output interface the previous time as the current output electric energy parameter. For example, a current output power of the output interface 120 is determined according to an output power supplied by the power supply circuit 110 to the output interface 120 when the power supply device 100 last time. It may be understood that, the control method may further include: storing output power currently supplied by the power supply circuit 110 to the output interface 120, to subsequently determine the stored output power as the current output power.

Step S130: When the current output electric energy parameter of the output interface meets the demand electric energy parameter, use the current output electric energy parameter as a target output electric energy parameter, and when the current output electric energy parameter of the output interface does not meet the demand electric energy parameter, determine an output electric energy parameter greater than the demand electric energy parameter as the target output electric energy parameter.

In some implementations, it may be further determined whether the current output electric energy parameter of the output interface meets the demand electric energy parameter.

In some implementations, the determining whether the current output electric energy parameter of the output interface meets the demand electric energy parameter includes: comparing the current output electric energy parameter with the demand electric energy parameter; and determining, if the current output electric energy parameter is less than the demand electric energy parameter, that the current output electric energy parameter does not meet the demand electric energy parameter; or determining, if the current output electric energy parameter is greater than or equal to the demand electric energy parameter, that the current output electric energy parameter meets the demand electric energy parameter. For example, it may be determined, according to a magnitude relationship between the current output power of the output interface 120 and a demand power of the load device 200, whether a current output electric energy parameter of the output interface 120 meets the demand electric energy parameter of the load device 200. For example, if the current output power of the output interface 120 is less than the demand power of the load device 200, it is determined that the current output electric energy parameter does not meet the demand electric energy parameter. If the current output power of the output interface 120 is greater than or equal to the demand power of the load device 200, it is determined that the current output electric energy parameter can meet the demand electric energy parameter.

It may be understood that, when the current output electric energy parameter of the output interface 120 can meet the demand electric energy parameter, the load device can start to run. When the current output electric energy parameter of the output interface 120 does not meet the demand electric energy parameter, an electric energy parameter such as a power acquired by the load device 200 is not sufficient to support the load device 200 in starting to run.

For example, when the current output electric energy parameter of the output interface 120 meets the demand electric energy parameter, for example, when the current output power of the output interface 120 is greater than the demand power of the load device 200, the output power supplied by the power supply circuit 110 to the output interface 120 may be the current output power, to enable the load device 200 to start to run.

To ensure that the load device 200 can start to run, when the current output electric energy parameter of the output interface 120 does not meet the demand electric energy parameter, an output electric energy parameter greater than the demand electric energy parameter may be determined as the target output electric energy parameter of the output interface 120.

In some implementations, the determining an output electric energy parameter greater than the demand electric energy parameter as the target output electric energy parameter includes: acquiring a maximum output electric energy parameter of the output interface, and using the maximum output electric energy parameter as the target output electric energy parameter. In this embodiment, when it is determined that the current output electric energy parameter of the output interface cannot meet the demand electric energy parameter, the maximum output electric energy parameter of the output interface is directly acquired, and the power supply circuit is controlled to output the maximum output electric energy parameter through the output interface, to quickly meet a running demand of the load device, thereby achieving an objective of quickly loading the load device.

For example, when the current output electric energy parameter of the output interface does not meet the demand electric energy parameter, the maximum output electric energy parameter of the output interface may be acquired, and the maximum output electric energy parameter may be used as the target output electric energy parameter. For example, if a preset output power of the output interface 120 is less than a demand power, the power supply circuit 110 may be controlled to output a preset maximum output power for supply to the output interface 120. In other words, a target power may be a maximum power value in a power range corresponding to the power supply circuit 110.

In some implementations, the determining an output electric energy parameter greater than the demand electric energy parameter as the target output electric energy parameter includes: acquiring an output electric energy parameter table of the output interface, where the output electric energy parameter table includes multiple output electric energy parameters of the output interface, and the multiple output electric energy parameters are sequentially sorted based on a preset difference; and searching the output electric energy parameter table by using a search condition that an output electric energy parameter has the smallest difference from the demand electric energy parameter and is greater than the demand electric energy parameter, and using an output electric energy parameter that meets the search condition as the target output electric energy parameter. Certainly, this application is not limited thereto. For example, the output electric energy parameter of the power supply circuit 110 is continuously adjustable, an output electric energy parameter greater than demand electric energy parameter may be determined as the target output electric energy parameter. For example, a preset multiple is multiplied by the demand electric energy parameter to obtain the target output electric energy parameter. The preset multiple is, for example, 1.1 to 1.5, for example, 1.3. For example, a power range corresponding to the power supply circuit 110 is 300 W to 800 W. For example, when a demand power is 450 W, the output power supplied by the power supply circuit 110 to the output interface 120 may be controlled to be a power value from 300 W to 800 W, for example, 600 W.

For example, an output electric energy parameter table of the output interface 120 includes an output power, for example, 300 W, 500 W, or 700 W, of the output interface 120. When the demand electric energy parameter is 450 W, it may be determined that 500 W is the target output electric energy parameter of the output interface 120. When the power supply circuit 110 outputs the target output electric energy parameter to the load device 200 through the output interface 120, the electric energy parameter such as the power acquired by the load device 200 is sufficient to support the load device 200 in starting to run.

Step S140: Control a power supply circuit to output the target output electric energy parameter to the load device through the output interface, to enable the load device to start to run with the target output electric energy parameter.

The power supply circuit 110 is controlled to output, through the output interface 120, a target output electric energy parameter that can meet the demand electric energy parameter to the load device 200 to enable the load device 200 to start to run.

Refer to FIG. 3. A value of the power outputted by the power supply circuit 110 when S1 is closed is 300 W, a value of the power outputted by the power supply circuit 110 when S2 is closed is 500 W, and a value of the power outputted by the power supply circuit 110 when S3 is closed is 700 W. For example, when the demand power is 450 W, the output power supplied by the power supply circuit 110 to the output interface 120 may be controlled to be 500 W, to enable the load device 200 to start to run.

For example, when it is detected that the load device 200 is connected to the output interface 120 and/or it is detected that the load device 200 starts to be started, an output electric energy parameter supplied by the power supply circuit 110 to the output interface 120 is controlled to be greater than or equal to the demand electric energy parameter, so that a demand of an electric energy parameter of the load device 200 can be quickly met, to enable the load device 200 to start to run.

Step S150: After it is determined that the load device is running, adjust the target output electric energy parameter outputted by the power supply circuit to the output interface to be consistent with the demand electric energy parameter.

The power supply device 100 supplies power to the load device 200 through the output interface 120. After the load device starts to run, an output electric energy parameter such as the output power supplied by the power supply circuit 110 to the output interface 120 may be adjusted. For example, opening or closing of the first switch element 112 in the power supply circuit 110 is adjusted, to enable the power outputted by the power supply circuit 110 to be consistent with the demand power of the load device 200. For example, in a power supplying process, the output power of the output interface 120 is gradually enabled, through opening and closing of the first switch element 112, to be consistent with the demand power of the load device 200, so that the most appropriate output power can be supplied to the load device 200, to reduce unnecessary energy consumption, thereby improving utilization of electric energy.

In some implementations, the adjusting the target output electric energy parameter outputted by the power supply circuit to the output interface to be consistent with the demand electric energy parameter includes: acquiring a difference between the target output electric energy parameter and the demand electric energy parameter; determining a proportional and integral (PI) adjustment value according to the difference; and adjusting, according to the PI adjustment value, the target output electric energy parameter outputted by the power supply circuit to the output interface, until the target output electric energy parameter outputted by the power supply circuit to the output interface is consistent with the demand electric energy parameter. The difference between the target output electric energy parameter and the demand electric energy parameter is used as a control deviation, and a proportion and an integral of the control deviation are linearly combined to form a control amount to control the power supply circuit, to enable the target output electric energy parameter outputted by the power supply circuit to the output interface to be consistent with the demand electric energy parameter more quickly and more accurately.

In some implementations, the power supply device 100 includes multiple power supply circuits 110. For example, there are a plurality of power supply circuits 110. As shown in FIG. 4, the power supply device 100 includes a power supply circuit 110A and a power supply circuit 110B.

Optionally, at least two power supply circuits 110 in the power supply device 100 have different electric energy parameter output ranges, for example, have different outputted power ranges. For example, a power that can be outputted by the power supply circuit 110A is not greater than 300 W, and a power that can be outputted by the power supply circuit 110B is not greater than 1000 W.

For example, different power supply circuits 110 may be switched to supply power to the output interface 120, so that the output interface 120 have different electric energy parameter output ranges and current output electric energy parameters. For example, as shown in FIG. 4, switching may be performed to connect the power supply circuit 110A to an output interface 120A, to make a power range of the output interface 120A to be not greater than 300 W, or switching may be performed to connect the power supply circuit 110B to the output interface 120A, to make a power range of the output interface 120A to be not greater than 1000 W. It should be noted that there may be one or more output interfaces 120 of the power supply device 100. For example, the power supply device 100 may further include an output interface 120B. For example, as shown in FIG. 4, switching may be performed to connect the power supply circuit 110A to an output interface 120B, to make a power range of the output interface 120B to be not greater than 300 W, or switching may be performed to connect the power supply circuit 110B to the output interface 120B, to make a power range of the output interface 120B to be not greater than 1000 W.

For example, as shown in FIG. 4, the power supply device 100 further includes a switching circuit 150. For example, the switching circuit 150 includes a second switch element. A power supply circuit 110 connected with the output interface 120 may be switched by controlling the second switch element in the switching circuit 150. As shown in FIG. 4, the switching circuit 150 includes second switch elements S11, S12, S21, and S22. For example, the power supply circuit 110A may be connected to the output interface 120A or the power supply circuit 110A may be connected to the output interface 120B by controlling the second switch elements S11 and S12. For example, the power supply circuit 110B may be connected to the output interface 120A or the power supply circuit 110B may be connected to the output interface 120B by controlling the second switch elements S21 and S22. For example, the power supply circuit 110A may be connected to the output interface 120A and the power supply circuit 110B may be connected to the output interface 120B or the power supply circuit 110A may be connected to the output interface 120B and the power supply circuit 110B may be connected to the output interface 120A by controlling the second switch elements S11, S12, S21, and S22. Certainly, this application is not limited thereto.

For example, it may be preset that the power supply circuit 110A is connected to the output interface 120A and the power supply circuit 110B is connected to the output interface 120B. A rated output power corresponding to the output interface 120A is, for example, 300 W. A rated output power corresponding to the output interface 120B is, for example, 1000 W. Switching may be performed by controlling the switching circuit 150, to enable the power supply circuit 110A to be connected to the output interface 120B and/or enable the power supply circuit 110B to be connected to the output interface 120A.

In some implementations, the control method further includes: determining a target power supply circuit corresponding to the output interface according to the electric energy parameter output ranges of the power supply circuits and the demand electric energy parameter; and controlling the target power supply circuit to connect with the output interface. In this way, the electric energy parameter outputted by the target power supply circuit can meet the demand electric energy parameter.

For example, the switching circuit 150 is controlled according to power ranges that respectively correspond to the plurality of power supply circuits 110 and a demand power of a load device 200 connected to the output interface 120 to switch a power supply circuit 110 that is connected with the output interface 120.

In some implementations, the determining a target power supply circuit corresponding to the output interface according to the electric energy parameter output ranges of the power supply circuits and the demand electric energy parameter includes: using, if an electric energy parameter output range upper limit of a power supply circuit is greater than the demand electric energy parameter, the power supply circuit as the target power supply circuit corresponding to the output interface.

For example, if the demand power of the load device 200 connected to the output interface 120A is 450 W, when a power range corresponding to the power supply circuit 110A is not greater than 300 W and the demand power of 450 W cannot be met when the power supply circuit 110A is connected to the output interface 120A, the switching circuit 150 may be controlled to switch to the power supply circuit 110B to connect with the output interface 120A. For example, the second switch elements S11 and S12 are opened, to switch the second switch elements S21 and S22 to the output interface 120A. In this case, power is supplied to the output interface 120A through the power supply circuit 110B. Specifically, it may be controlled that an output power supplied by the power supply circuit 110B to the output interface 120A is greater than a demand power, so that the load device 200 can start to run, and after the load device 200 starts to run, the output power supplied by the power supply circuit 110B to the output interface 120A is adjusted to approach the demand power.

For example, if an output power upper limit of a power supply circuit 110 is greater than a demand power, the switching circuit 150 is controlled to switch to the power supply circuit 110 to connect with the output interface 120. If the demand power of the load device 200 connected to the output interface 120A is 450 W, when the power range corresponding to the power supply circuit 110A is not greater than 300 W and a power range corresponding to the power supply circuit 110B is not greater than 1000 W, an output power upper limit of the power supply circuit 110B is greater than the demand power, and the switching circuit 150 may be controlled to switch to the power supply circuit 110B to connect with the output interface 120A.

In some implementations, an electric energy parameter output range lower limit, for example, an output power lower limit, that is, a minimum output power, of the power supply circuit 110 may further be set. For example, an output power lower limit of the power supply circuit 110A may be 0.1 W, and an output power lower limit of the power supply circuit 110B may be 500 W. When a demand power of a load device 200 connected to the output interface 120B is 450 W, because the demand power of the load device 200 is less than the output power lower limit of the power supply circuit 110B and the power supply circuit 110B supplies power to the load device 200, utilization of electric energy is low. The switching circuit 150 may be controlled to switch to the power supply circuit 110A to connect with the output interface 120B.

For example, the determining a target power supply circuit according to the electric energy parameter output ranges of the power supply circuits and the demand electric energy parameter includes: using, if the electric energy parameter output range upper limit of the power supply circuit is greater than the demand electric energy parameter and an electric energy parameter output range lower limit of the power supply circuit is less than or equal to the demand electric energy parameter, the power supply circuit as the target power supply circuit.

For example, if an output power upper limit of a power supply circuit 110 is greater than a demand power and an output power lower limit is less than or equal to the demand power, the power supply circuit 110 is used as the target power supply circuit, and the switching circuit 150 may be controlled to switch to the power supply circuit 110 to connect with the output interface 120. For example, it may be controlled that an output power supplied by the power supply circuit 110A to the output interface 120B is greater than a demand power of 450 W, so that the load device 200 can start to run, and after the load device 200 starts to run, the output power supplied by the power supply circuit 110A to the output interface 120B is adjusted to approach the demand power, to reduce unnecessary energy consumption, thereby improving utilization of electric energy.

In some implementations, as shown in FIG. 4, the power supply device 100 includes multiple output interfaces 120. For example, there may be a plurality of output interfaces 120. The plurality of output interfaces 120 may be connected to one or more load devices 200. The load devices 200 connected to the plurality of output interfaces 120 may be of a same type or different types.

For example, at least two output interfaces 120 can be respectively connected to a first load device 200 and a second load device 200. A demand electric energy parameter of the first load device 200 is greater than a demand electric energy parameter of the second load device 200. For example, a demand power of the first load device 200 is greater than a demand power of the second load device 200.

For example, the using, if an electric energy parameter output range upper limit of a power supply circuit is greater than the demand electric energy parameter, the power supply circuit as the target power supply circuit corresponding to the output interface includes: using, if electric energy parameter output range upper limits of a first power supply circuit and a second power supply circuit in a plurality of power supply circuits are both greater than the demand electric energy parameter of the first load device and the demand electric energy parameter of the second load device and the electric energy parameter output range upper limit of the first power supply circuit is greater than the electric energy parameter output range upper limit of the second power supply circuit, the first power supply circuit as a target power supply circuit corresponding to an output interface connected to the first load device, and using the second power supply circuit as a target power supply circuit corresponding to an output interface connected to the second load device. A power supply circuit whose electric energy parameter output range upper limit is greater than the demand electric energy parameter and is close to the demand electric energy parameter is obtained as the target power supply circuit through matching, so that unnecessary energy consumption can be reduced, thereby improving utilization of electric energy.

For example, if output power upper limits of the first power supply circuit 110A and the second power supply circuit 110B in the plurality of power supply circuits 110 are both greater than the demand power of the first load device 200 and the demand power of the second load device 200, and the output power upper limit of the first power supply circuit 110A is greater than the output power upper limit of the second power supply circuit 110B, the switching circuit 150 may be controlled to switch to the first power supply circuit 110A to connect with the output interface 120A connected to the first load device 200 and the second the power supply circuit 110B to connect with the output interface 120B connected to the second load device 200.

For example, refer to FIG. 4. the demand power of the first load device 200 connected to the output interface 120A is 900 W, and the demand power of the second load device 200 connected to the output interface 120B is 300 W. If a power that can be provided by the power supply circuit 110A is 300 W and a power that can be provided by the power supply circuit 110B is 1000 W, the switching circuit 150 may be controlled to connect the power supply circuit 110A to the output interface 120B and connect the power supply circuit 110B to the output interface 120A. For example, it may be controlled that the output power supplied by the power supply circuit 110A to the output interface 120B is greater than 300 W and/or the output power supplied by the power supply circuit 110B to the output interface 120A is greater than 900 W, to enable a corresponding load device 200 to start to run. After the load device 200 starts to run, the output power supplied by the power supply circuit 110A to the output interface 120B is adjusted to approach 300 W and/or the output power supplied by the power supply circuit 110B to the output interface 120A is adjusted to approach 900 W, so that unnecessary energy consumption is reduced, thereby improving utilization of electric energy.

For example, refer to FIG. 4. The demand power of the first load device 200 connected to the output interface 120A is 450 W, and the demand power of the second load device 200 connected to the output interface 120B is 900 W. If the power that can be provided by the power supply circuit 110A is 300 W, the power that can be provided by the power supply circuit 110B is 1000 W, the power supply circuit 110A cannot meet a loading demand of the first load device 200, and the power supply circuit 110B can meet loading demands of the first load device 200 and the second load device 200, the power supply circuit 110B may be connected to the output interface 120A by controlling the switching circuit 150 to supply power to the first load device 200, and/or the power supply circuit 110B may further be connected to the output interface 120B to supply power to the second load device 200, and it may be controlled that the output powers supplied by the power supply circuit 110B to the output interface 120A and/or the output interface 120B are greater than the demand powers of the first load device 200 and/or the second load device 200, to enable a corresponding load device 200 to start to run. After the load device 200 starts to run, a power outputted by the power supply circuit 110B is adjusted to approach the demand power of the load device 200, to reduce unnecessary energy consumption, thereby improving utilization of electric energy.

In some implementations, the control method of a power supply device includes:

- acquiring, in response to an access operation to the output interface, a demand electric energy parameter of a load device connected to the output interface;
- determining a target power supply circuit corresponding to the output interface according to the electric energy parameter output ranges of the power supply circuits and the demand electric energy parameter;
- controlling the target power supply circuit to connect with the output interface;
- acquiring a current output electric energy parameter of the output interface;
- determining whether the current output electric energy parameter of the output interface meets the demand electric energy parameter;
- when the current output electric energy parameter of the output interface meets the demand electric energy parameter, using the current output electric energy parameter as a target output electric energy parameter, and when the current output electric energy parameter of the output interface does not meet the demand electric energy parameter, determining an output electric energy parameter greater than the demand electric energy parameter as the target output electric energy parameter;
- controlling a power supply circuit to output the target output electric energy parameter to the load device through the output interface, to enable the load device to start to run with the target output electric energy parameter; and
- after it is determined that the load device is running, adjusting the target output electric energy parameter outputted by the power supply circuit to the output interface to be consistent with the demand electric energy parameter.

For example, switching is first performed according to a demand power of a load device connected to an output interface to a corresponding power supply circuit to supply power to the output interface, so that a power demand of the load device can be better met. For example, a power greater than the demand power may be first provided to the load device, and then an outputted power is adjusted to approach the demand power of the load device. Alternatively, when a power supply device includes a plurality of output interfaces, a user may plug the load device at will without selecting an output interface to which the load device needs to be connected, or may switch to a corresponding power supply circuit to supply power to an output interface, to enable a power outputted by the power supply device to meet the power demand of the load device.

In the control method of a power supply device provided in embodiments of this application, a demand electric energy parameter of a load device connected to an output interface is acquired in response to an access operation to the output interface; the demand electric energy parameter of the load device is acquired; when a current output electric energy parameter of the output interface meets the demand electric energy parameter, the current output electric energy parameter is used as a target output electric energy parameter, and when the current output electric energy parameter of the output interface does not meet the demand electric energy parameter, an output electric energy parameter greater than the demand electric energy parameter is determined as the target output electric energy parameter; a power supply circuit is controlled to output the target output electric energy parameter to the load device through the output interface, to enable the load device to start to run with the target output electric energy parameter; and after it is determined that the load device is running, the target output electric energy parameter outputted by the power supply circuit is adjusted to the output interface to be consistent with the demand electric energy parameter. A demand electric energy parameter of an external load may be quickly met first, to facilitate start of a load device, and subsequently an output electric energy parameter is gradually adjusted to approach the demand electric energy parameter of the load device, so that the external load can be loaded with the most appropriate output electric energy parameter, to reduce unnecessary energy consumption.

Figure 5:
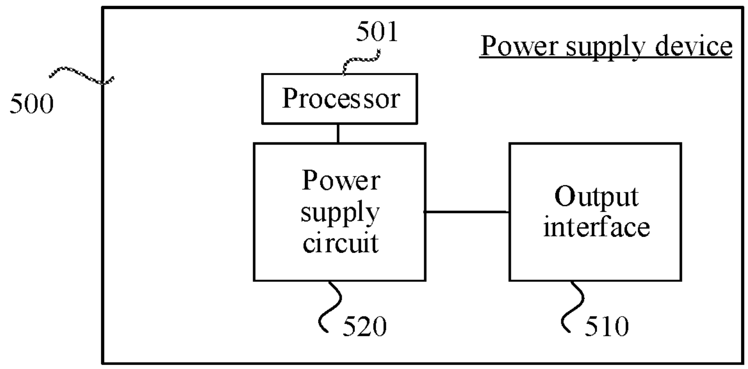
FIG. 5 is a schematic diagram of a structure of a power supply device according to an embodiment of this application.

With reference to the foregoing embodiments, FIG. 5 is a schematic diagram of a structure of a power supply device 500 according to an embodiment of this application.

As shown in FIG. 5, the power supply device 500 includes an output interface 510 and a power supply circuit 520.

The output interface 510 can be connected to a load device. The power supply circuit 520 is configured to output an electric energy parameter through the output interface 510, to supply power to the load device connected to the output interface 510.

For example, the power supply circuit 520 is configured to perform one or more types of the following processing on electric energy: rectification, inversion, voltage adjustment, current adjustment, and frequency adjustment. Certainly, this application is not limited thereto. For example, the power supply circuit may adjust a power outputted by the power supply circuit 520. For example, the power outputted by the power supply circuit 520 may be adjusted by adjusting a voltage amplitude and/or a current amplitude outputted by the power supply circuit 520.

Optionally, the power supply device 500 further includes an energy storage apparatus, for example, a rechargeable battery or a non-rechargeable battery, or may not include an energy storage apparatus. For example, the power supply device 500 may acquire electric energy from outside, for example, acquire electric energy from a grid, a generator, the energy storage apparatus connected to the power supply device 500, a solar battery, or the like.

As shown in FIG. 5, the power supply device 500 further includes one or more processors 501. The one or more processors 501 operate separately or together, and are configured to perform the steps of the foregoing control method.

For example, the power supply device 500 further includes a memory.

For example, the processor 501 is connected to the memory by a bus. The bus is, for example, an inter-integrated circuit (I2C) bus.

Specifically, the processor 501 may be a microcontroller unit (MCU), a central processing unit (CPU), a digital signal processor (DSP), or the like.

Specifically, the memory may be a flash chip, a read-only memory (ROM), a magnetic disk, an optical disc, a USB flash drive, a removable hard disk, or the like.

The processor 501 is configured to: run a computer program stored in the memory, and implement, when executing the computer program, the steps of the foregoing control method of a power supply device.

Specific principles and implementations of the power supply device provided in embodiments of this application are similar to the control method in the foregoing embodiments. Details are not described herein. An embodiment of this application further provides a computer-readable storage medium. The computer-readable storage medium stores a computer program. When the computer program is executed by a processor, the processor is enabled to implement the steps of the control method provided in the foregoing embodiments.

The computer-readable storage medium may be an internal storage unit of the power supply device described in any of the foregoing embodiments, for example, a hard disk or memory of the power supply device. The computer-readable storage medium may be an external storage device of the power supply device, for example, a removable hard disk, a smart memory card (SMC), a secure digital (SD) card, or a flash card equipped on the power supply device.

It should be understood that the terms used herein in this application are used merely for the purpose of describing specific embodiments and are not intended to limit this application.

It should also be understood that the term "and/or" used in this application and the appended claims refers to and includes any combination and all possible combinations of one or more of the items listed in association.

The foregoing descriptions are merely specific implementations of this application, but are not intended to limit the scope of protection of this application. Any equivalent modification or replacement readily figured out by persons skilled in the art within the technical scope disclosed in this application shall fall within the scope of protection of this application. Therefore, the scope of protection of this application shall be subject to the scope of protection of the claims.

What is claimed is:

1. A control method of a power supply device, wherein the power supply device comprises a power supply circuit and an output interface, the power supply circuit is connected to the output interface, the power supply circuit outputs an electric energy parameter through the output interface, the electric energy parameter comprises a power value, and the control method comprises:

acquiring, in response to an access operation to the output interface, a demand electric energy parameter of a load device connected to the output interface, the demand electric energy parameter comprising a demand power value;

acquiring a current output electric energy parameter of the output interface, the current output electric energy parameter comprising a current output power value;

when the current output electric energy parameter of the output interface meets the demand electric energy parameter, using the current output electric energy parameter as a target output electric energy parameter, and when the current output electric energy parameter of the output interface does not meet the demand electric energy parameter, determining an output electric energy parameter greater than the demand electric energy parameter as the target output electric energy parameter, the output electric energy parameter comprising an output power value;

controlling the power supply circuit to output the target output electric energy parameter to the load device through the output interface, to enable the load device to start to run with the target output electric energy parameter; and after it is determined that the load device is running, reducing the target output electric energy parameter outputted by the power supply circuit to the output interface to a level approaching the demand electric energy parameter.

2. The control method according to claim 1, wherein the control method further comprises:

determining, if the current output electric energy parameter is less than the demand electric energy parameter, that the current output electric energy parameter does not meet the demand electric energy parameter; or determining, if the current output electric energy parameter is greater than or equal to the demand electric energy parameter, that the current output electric energy parameter meets the demand electric energy parameter.

3. The control method according to claim 1, wherein the determining an output electric energy parameter greater than the demand electric energy parameter as the target output electric energy parameter comprises:

acquiring an output electric energy parameter table of the output interface, wherein the output electric energy parameter table comprises multiple output electric energy parameters of the output interface, and the multiple output electric energy parameters are sequentially sorted based on a preset difference; and searching the output electric energy parameter table by using a search condition that an output electric energy parameter has the smallest difference from the demand electric energy parameter and is greater than the demand electric energy parameter, and using an output electric energy parameter that meets the search condition as the target output electric energy parameter.

4. The control method according to claim 1, wherein the determining an output electric energy parameter greater than the demand electric energy parameter as the target output electric energy parameter comprises:

acquiring a maximum output electric energy parameter of the output interface, and using the maximum output electric energy parameter as the target output electric energy parameter.

5. The control method according to claim 1, wherein the acquiring a current output electric energy parameter of the output interface comprises:

acquiring a rated output electric energy parameter of the output interface, and using the rated output electric energy parameter as the current output electric energy parameter of the output interface.

6. The control method according to claim 1, wherein the power supply device comprises multiple power supply circuits, and at least two power supply circuits have different electric energy parameter output ranges; and the control method further comprises:

determining a target power supply circuit corresponding to the output interface according to the electric energy parameter output ranges of the power supply circuits and the demand electric energy parameter; and controlling the target power supply circuit to connect with the output interface.

7. The control method according to claim 6, wherein the determining a target power supply circuit corresponding to the output interface according to the electric energy parameter output ranges of the power supply circuits and the demand electric energy parameter comprises:

using, if an electric energy parameter output range upper limit of a power supply circuit is greater than the demand electric energy parameter, the power supply circuit as the target power supply circuit corresponding to the output interface.

8. The control method according to claim 7, wherein the power supply device comprises multiple output interfaces, at least two output interfaces are respectively connected to a first load device and a second load device, and a demand electric energy parameter of the first load device is greater than a demand electric energy parameter of the second load device; and the using, if an electric energy parameter output range upper limit of a power supply circuit is greater than the demand electric energy parameter, the power supply circuit as the target power supply circuit corresponding to the output interface comprises:

using, if electric energy parameter output range upper limits of a first power supply circuit and a second power supply circuit in a plurality of power supply circuits are both greater than the demand electric energy parameter of the first load device and the demand electric energy parameter of the second load device and the electric energy parameter output range upper limit of the first power supply circuit is greater than the electric energy parameter output range upper limit of the second power supply circuit, the first power supply circuit as a target power supply circuit corresponding to an output interface connected to the first load device, and using the second power supply circuit as a target power supply circuit corresponding to an output interface connected to the second load device.

9. The control method according to claim 6, wherein the determining a target power supply circuit corresponding to the output interface according to the electric energy parameter output ranges of the power supply circuits and the demand electric energy parameter comprises:

using, if the electric energy parameter output range upper limit of the power supply circuit is greater than the demand electric energy parameter and an electric energy parameter output range lower limit of the power supply circuit is less than or equal to the demand electric energy parameter, the power supply circuit as the target power supply circuit corresponding to the output interface.

10. The control method according to claim 1, wherein the acquiring a current output electric energy parameter of the output interface comprises:

acquiring an electric energy parameter outputted by the output interface a previous time, and using the electric energy parameter outputted by the output interface the previous time as the current output electric energy parameter.

11. A control method of a power supply device, wherein the power supply device comprises a power supply circuit and an output interface, the power supply circuit is connected to the output interface, the power supply circuit outputs an electric energy parameter through the output interface, the electric energy parameter comprises a power value, and the control method comprises:

acquiring, in response to an access operation to the output interface, a demand electric energy parameter of a load device connected to the output interface, the demand electric energy parameter comprising a demand power value;

acquiring a current output electric energy parameter of the output interface, wherein the current output electric energy parameter comprises a current output power value, and the current output electric energy parameter is a rated output electric energy parameter of the output interface or an electric energy parameter outputted by the output interface a previous time;

when the current output electric energy parameter of the output interface meets the demand electric energy parameter, using the current output electric energy parameter as a target output electric energy parameter, and when the current output electric energy parameter of the output interface does not meet the demand electric energy parameter, determining an output electric energy parameter greater than the demand electric energy parameter as the target output electric energy parameter, the output electric energy parameter comprising an output power value;

controlling the power supply circuit to output the target output electric energy parameter to the load device through the output interface, to enable the load device to start to run with the target output electric energy parameter; and after it is determined that the load device is running, reducing the target output electric energy parameter outputted by the power supply circuit to the output interface to a level approaching the demand electric energy parameter.

12. A power supply device, comprising:

an output interface;

a power supply circuit, configured to output an electric energy parameter through the output interface, the electric energy parameter comprising a power value; and one or more processors, wherein the one or more processors operate separately or together, and are configured to implement a control method, comprising:

acquiring, in response to an access operation to the output interface, a demand electric energy parameter of a load device connected to the output interface, the demand electric energy parameter comprising a demand power value;

acquiring a current output electric energy parameter of the output interface, the current output electric energy parameter comprising a current output power value;

when the current output electric energy parameter of the output interface meets the demand electric energy parameter, using the current output electric energy parameter as a target output electric energy parameter, and when the current output electric energy parameter of the output interface does not meet the demand electric energy parameter, determining an output electric energy parameter greater than the demand electric energy parameter as the target output electric energy parameter, the output electric energy parameter comprising an output power value;

controlling the power supply circuit to output the target output electric energy parameter to the load device through the output interface, to enable the load device to start to run with the target output electric energy parameter; and after it is determined that the load device is running, reducing the target output electric energy parameter outputted by the power supply circuit to the output interface to a level approaching the demand electric energy parameter.

* * * * *